United States Patent
Tiwari et al.

(10) Patent No.: US 11,078,786 B2
(45) Date of Patent: Aug. 3, 2021

(54) SALT MOBILITY ASSESSMENT AND REVIEW TECHNIQUE (SMART) FOR EXPLORATORY WELLS

(71) Applicant: Saudi Arabian Oil Company, Dhahran (SA)

(72) Inventors: Shrikant Tiwari, Dhahran (SA); Opeyemi Adewuya, Dhahran (SA); Jaber Al-Fayyadh, Dhahran (SA); Ali Al-Mousa, Ad Dammam (SA); Gregory Dolciani, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 534 days.

(21) Appl. No.: 15/994,467

(22) Filed: May 31, 2018

(65) Prior Publication Data
US 2019/0368348 A1 Dec. 5, 2019

(51) Int. Cl.
*E21B 44/00* (2006.01)
*E21B 49/00* (2006.01)
(Continued)

(52) U.S. Cl.
CPC ........ *E21B 49/006* (2013.01); *E21B 41/0007* (2013.01); *E21B 44/00* (2013.01); *G01V 1/38* (2013.01); *G01V 1/50* (2013.01); *G01V 99/005* (2013.01); *G01V 2200/16* (2013.01); *G01V 2210/66* (2013.01)

(58) Field of Classification Search
CPC ........ E21B 49/006; E21B 44/00; E21B 45/00; E21B 47/00; E21B 49/003; E21B 21/08; G01V 11/00; G01V 1/50; G01V 2200/16; G01V 2210/66; G01V 99/005

USPC ............... 166/250.01; 175/45; 324/303, 338; 507/100; 702/6–9, 11–12
See application file for complete search history.

(56) References Cited

U.S. PATENT DOCUMENTS

| 3,286,163 A | 11/1966 | Holser et al. |
| 4,926,393 A | 5/1990 | McClellan et al. |

(Continued)

FOREIGN PATENT DOCUMENTS

WO 2018049055 A2 3/2018

OTHER PUBLICATIONS

Brown, John P. et al.; "Pre-Drill and Real-Time Pore Pressure Prediction: Lessons from a Sub-Salt, Deep Water Wildcat Well, Red Sea, KSA" SPE-172743-MS, SPE Middle East Oil & Gas Show Bahrain, Mar. 8-11, 2017, pp. 1-6.
(Continued)

*Primary Examiner* — Jeffrey P Aiello
(74) *Attorney, Agent, or Firm* — Bracewell LLP; Constance G. Rhebergen; Brian H. Tompkins (57) ABSTRACT

Provided are methods for drilling a well having a wellbore that extends into the earth and that encounters a salt layer. Such methods include determinations of subsurface salt mobility and salt balance load mud weight and the performance of salt mobility tests to determine salt creep and wellbore enlargement problems. A salt formation may be determined from well log data and a drilling rate. The presence of salt creep may be determined from torque generated by the drilling assembly and a hook load. The initial mud weight of a drilling fluid may be adjusted to a salt balance load mud weight (SBLMW) to mitigate or prevent salt creep during drilling.

17 Claims, 5 Drawing Sheets

(51) Int. Cl.
*G01V 1/50* (2006.01)
*E21B 41/00* (2006.01)
*G01V 1/38* (2006.01)
*G01V 99/00* (2009.01)

(56) References Cited

U.S. PATENT DOCUMENTS

| | | | |
|---|---|---|---|
| 5,170,377 | A | 12/1992 | Manzur et al. |
| 5,615,115 | A * | 3/1997 | Shilling ............... E21B 47/06 702/12 |
| 6,693,553 | B1 * | 2/2004 | Ciglenec ............... E21B 23/14 340/853.1 |
| 7,142,986 | B2 | 11/2006 | Moran |
| 7,649,804 | B2 * | 1/2010 | Sinha ..................... G01V 1/50 367/35 |
| 9,822,639 | B2 | 11/2017 | Jandhyala et al. |
| 2008/0308318 | A1 * | 12/2008 | Moore ..................... E21B 4/04 175/51 |
| 2009/0109794 | A1 | 4/2009 | Sinha |
| 2011/0174541 | A1 * | 7/2011 | Strachan ............... E21B 44/00 175/27 |
| 2012/0037422 | A1 * | 2/2012 | Rasheed ............... E21B 47/095 175/50 |
| 2013/0126240 | A1 | 5/2013 | Johnston et al. |
| 2014/0214325 | A1 * | 7/2014 | Wessling ............... E21B 47/06 702/11 |
| 2014/0246244 | A1 * | 9/2014 | Shen ..................... E21B 49/006 175/65 |
| 2016/0178787 | A1 * | 6/2016 | Le .......................... G01V 3/28 702/7 |
| 2017/0115412 | A1 * | 4/2017 | Pixton .................... G01V 1/282 |
| 2019/0227192 | A1 * | 7/2019 | Castagnoli ........... G01V 99/005 |
| 2020/0056478 | A1 * | 2/2020 | Lima .................... E21B 41/00 |

OTHER PUBLICATIONS

Chapter 3 "Salt Creep Theory" available as of Dec. 15, 2017 at the website: https://mafiadoc.com/3-salt-creep-theory-puc-rio_59dd1da91723dd58efc6bbde.html; pp. 31-52.

Dawson, Paul R.; "Constitutive Models Applied in the Analysis of Creep of Rock Salt" SAND-79-1037, Internal Publication, Unlimited Release, 1979; pp. 1-38.

Dusseault, Maurice B. et al.; "Drililng Through Salt: Constitutive Behavior and Drilling Strategies" ARMA/NARMS 04-608, 6th North America Rock Mechanics Symposium, Houston, TX, Jun. 5-9, 2004; pp. 1-13.

Gonzalez-Cao, J.; "A strain-dependent strength and dilation model of rock to study pre-peak behaviour in confined tests" Rock Engineering and Rock Mechanics: Structures in and on Rock Masses, London, 978-1-138-00149-7; pp. 853-858.

Huffman, Alan R. et al.; "Recent Advanced in Pore Pressure Prediction in Complex Geologic Environments" SPE 142211-PP, SPE Middle East Oil & Gas Show, Bahrain, Mar. 20-23, 2011; pp. 1-8.

Leyendecker, E.A. et al.; "Properly prepared oil muds aid massive salt drilling" World Oil Magazine, vol. 180, No. 5, Apr. 1975; pp. 1-5.

Liang, W. et al.; "Experimental investigation of mechanical properties of bedded salt rock" International Journal of Rock Mechanics & Mining Sciences 44 2007) pp. 400-411.

Liu, Xicai et al.; "A new analytical solution for wellbore creep in soft sediments and salt" ARMA 11-383, 45th US Rock Mechanics/Geomechanics Symposium, San Francisco, CA, Jun. 26-29, 2011; pp. 1-13.

Popp, Till et al.; "Evolution of dilatancy and permeability in rock salt during hydrostatic compaction and triaxial deformation" Journal of Geophysical Research, vol. 106, No. B3, Mar. 10, 2001; pp. 4061-4078.

Rios, A. et al.; "Dilatancy Criterion Applied for Borehole Stability During Drilling Salt Formations" SPE 153627, SPE Latin American & Caribbean Petroleum Engineering Conference, Mexico, Apr. 16-18, 2012; pp. 1-14.

Weijermars, R. et al.; "Closure of open wellbores in creeping salt sheets" Geophysics Journal International, (2014) 196; pp. 279-290.

Zhang, Jincai et al.; "Casing Ultradeep, Ultralong Salt Sections in Deep Water: A Case Study for Failure Diagnosis and Risk Mitigation in Record-Depth Well" SPE 114273, SPE Annual Technical Conference, Denver, CO, Sep. 21-24, 2008; pp. 1-24.

International Search Report and Written Opinion for International Application No. PCT/US2019/034940 (SA5864) dated Sep. 20, 2019; pp. 1-13.

* cited by examiner

SALT MOBILITY ASSESSMENT AND REVIEW TECHNIQUE (SMART) FOR EXPLORATORY WELLS

BACKGROUND

Field of the Disclosure

The present disclosure generally relates to drilling and developing a wellbore through a salt accumulation to access a sub salt oil and gas reservoir. More specifically, embodiments of the disclosure relate to determinations of subsurface salt mobility and salt balance load mud weight and the performance of salt mobility tests to determine salt creep and wellbore enlargement problems.

Description of the Related Art

After the oil and gas industry moved into exploration and discovery of new hydrocarbon frontiers in deepwater (that is, water depths greater than 750 feet) location, further exploration became challenging due to the detection and understanding of unique geological environments having large amounts of hydrocarbons beneath deepwater salt beds. Similar geological conditions exist in shallow water and land in many basins. Exploration and development in these geological conditions is challenging as existing salt drilling and completions practices did not apply to these geological environments and conditions. Moreover, the behavior of salt formations present significant difficulties, especially with regard to well construction techniques and engineering approaches to drill wellbores and produce hydrocarbons.

SUMMARY

Hydrocarbon accumulations may occur within subsurface geological structures either in pre-salt, post-salt or intra-salt settings. The geological events or dynamics of formation of various rock types that lead to the geomechanic state of the salt accumulations also produce hydrocarbon reservoirs and the complexities associated with drilling through salt layers.

Four (4) salt formation types are well known in the oil and gas industry: halite, carnallite, tachyhydrite and kainite. Salt at subsurface depths or significant depths of burial are mobile and easily deform under sustained loads or disturbances. The deformation or creep rate of salt is amplified with elevated subterranean temperatures. As will be appreciated, salt exhibits creep behavior because of its microcrystalline structure where slipping and gliding may occur between crystal planes of the structure. When encountered while drilling an oil or gas well, the salt formation deforms and creeps, rapidly closing around the drilling assembly to sometimes cause what is termed "stuck pipe" or, in some instances, a plugged hole that requires the hole to be drilled again.

Salt is typically denser and structurally more complex than other rock types; consequently, seismic waves travel through salt at greater velocities as compared to other rock types. Because of the greater seismic velocities recorded in salt formations, surface seismic surveys provide poor images above, within, and below salt accumulations after processing the seismic data. The lack of quality imaging information may also result in difficulty estimating pore pressures and discerning abnormally pressured inclusions in the salt. The use of 3D seismic acquisition and processing may significantly improve image quality; however, 3D seismic acquisition and processing is not sufficient for the image resolution and intrinsic data properties used in geomechanics characterization of salt behavior for the design and planning of drilling strategies. Several new seismic acquisition methods, such as single sensor acquisition systems, wide azimuth, or rich azimuth techniques, which all aim to increase seismic image resolution with an increase in receiver bandwidth.

Drilling with saturated brine in water-based mud (WBM) was, and in some instances still is, the conventional industry practice to prevent the dissolution of salt and hole washout while drilling through salt. To achieve supersaturation for effective retardation of salt dissolution, Dusseault et al. describes preheating the water-based mud before injection into deeper, hotter salt sections. See Dusseault et al., *Drilling Through Salt; Constitutive Behavior and Drilling Strategies*, 6th North America Rock Mechanics Symposium (NARMS), ARMA-04-608 (2004) (hereinafter "Dusseault"). Weijermars et al. describes the addition of flocculated bentonite to the saturated water-based mud or brine to further slow any wellbore dissolution. See Weijermars et al., *Closure of open wellbores in creeping salt sheets*, 196 Geophysical J. Intl., pp. 279-290 (2014) (hereinafter "Weijermars"). Weijermars further noted that flocculated bentonite in salt-saturated water-based mud can be formulated to build a mud cake layer to seal off salt sections in wellbores.

Current industry practice to further improve wellbore quality in terms of gauge and shape when drilling through salt is the use of oil-based muds (OBM), either in mineral oil or synthetic oil variants. The use of an oil-based mud may suppress salt dissolution and prevents washouts, however, oil-based mud is ineffective in slowing wellbore closure. Additional steps may include cooling the oil-based mud to transmit cooling effects to the salt to slow down wellbore closure.

Depending on thickness of the salt interval, depth of occurrence, and temperature at the top and the base of the salt, the window for salt mobility and determination of a salt balance load wellbore pressure and effective reduction in creep rate may be in the range of 1 hour to 10 hours. Existing approaches may use known isothermal curves if the salt behavior emulates the models and conditions used in determining the known isothermal curves. Other approaches include adjusting the mud weight or wellbore pressure $p_m$ to 0.7 times the overburden gradient at the top of salt and to 0.95 times the overburden gradient at the base of salt; however, such approaches are inapplicable in cases of elevated interval diffusion temperatures.

If the drilling assembly is stuck upon penetration of the salt accumulation (typically referred to as "stuck pipe"), the conventional practice for freeing the stuck drilling assembly is to pump enough water down the drilling assembly and into the annulus to dissolve the salt that may have crept and closed around the drilling assembly.

Embodiments of the disclosure address drilling problems related to drilling through salt, such as salt creep and other challenges. In some embodiments, the techniques described in the disclosure combine system state prediction modeling and parameter sets to enable field application and feedback adjustments, and may incorporate the expertise of experienced drilling and geomechanics specialists and decisions based on real-time data.

In one embodiment, a method for drilling a well having a wellbore extending into the earth is provided. The method includes obtaining well log data from a logging-while-drilling (LWD) tool, obtaining a drilling rate associated with drilling the well, and determining, from the well log data and the drilling rate, the presence of a salt formation encountered by the wellbore. The method also includes determining the presence of salt creep from a torque generated by the drilling assembly and a hook load and adjusting the mud weight of the drilling fluid. In some embodiments, the well log data comprises resistivity data, gamma ray data, and sonic compression data. In some embodiments, determining, from the well log data and the drilling rate, the presence of a salt formation encountered by the wellbore comprises at least one of the following: determining that a resistivity from the resistivity data is in the range of 100 to 200 ohm-meter, determining that a gamma ray measurement of the gamma ray data is in the range of ±15 gamma-ray, American Petroleum Industry (GAPI) units, and determining that a sonic compression of the sonic compression data is in the range of 65-67 microseconds/foot (µs/ft). In some embodiments, the method includes determining, from the well log data and the drilling rate, the presence of a salt formation encountered by the wellbore comprises determining a change in drilling rate at a constant applied weight on the drilling assembly. In some embodiments, the method includes determining the presence of salt creep by reversing the drilling assembly out of the wellbore and obtaining the drag from the reversing. In some embodiments, the method includes determining the presence of salt creep by determining a change in dimension of a borehole of the wellbore using an acoustic caliper sensor. In some embodiments, determining the presence of salt creep from a torque generated by the drilling assembly and a hook load includes rotating the drilling assembly and obtaining the torque generating by the rotation of the drilling assembly. In some embodiments, determining the presence of salt creep from a torque generated by the drilling assembly and a hook load includes inserting the drilling assembly into the wellbore and determining the drag generated by inserting the drill string into the wellbore. In some embodiments, adjusting the mud weight of the drilling fluid includes iteratively reducing the mud weight of the drilling fluid by 10 pounds-per-cubic foot (pcf) until the mud weight of the drilling fluid results in full circulation of the drilling mud. In some embodiments, the method includes determining the initial mud weight of the drilling fluid. In some embodiments, determining the initial mud weight of the drilling fluid includes determining the mud weight according to the following:

$$\rho_m = 101.94 \left(\frac{OVB}{TVD}\right) - 386.95 \left(\frac{\ln(OVB)}{TVD}\right) - \left(\frac{40.05}{TVD}\right)$$

where $\rho_m$ is the mud weight in grams/cubic centimeter (g/cc), OVB is the overburden stress in MPa, and TVD is the true vertical depth in meters (m).

In another embodiment, a method for drilling a well having a wellbore extending into the earth. The method includes determining an initial mud weight of a drilling fluid, determining, from the well log data and the drilling rate, the presence of a salt formation encountered by the wellbore, and determining the presence of salt creep from a torque generated by the drilling assembly and a hook load. The method also includes iteratively adjusting a mud weight of the drilling fluid until the drilling mud has full circulation. In some embodiments, the well log data comprises resistivity data, gamma ray data, and sonic compression data. In some embodiments, determining, from the well log data and the drilling rate, the presence of a salt formation encountered by the wellbore comprises at least one of the following: determining that a resistivity from the resistivity data is in the range of 100 to 200 ohm-meter, determining that a gamma ray measurement of the gamma ray data is in the range of ±15 gamma-ray, American Petroleum Industry (GAPI) units, and determining that a sonic compression of the sonic compression data is in the range of 65-67 microseconds/foot (µs/ft). In some embodiments, determining, from the well log data and the drilling rate, the presence of a salt formation encountered by the wellbore comprises determining a change in drilling rate at a constant applied weight on the drilling assembly. In some embodiments, the method includes determining the presence of salt creep by reversing the drilling assembly out of the wellbore and obtaining the drag from the reversing. In some embodiments, the method includes determining the presence of salt creep by determining a change in dimension of a borehole of the wellbore using an acoustic caliper sensor. In some embodiments, iteratively adjusting a mud weight of the drilling fluid until the drilling mud has full circulation comprises reducing the mud weight by 10 pounds-per-cubic foot (pcf) at each iteration. In some embodiments, determining the initial mud weight of the drilling fluid includes determining the mud weight according to the following:

$$\rho_m = 101.94 \left(\frac{OVB}{TVD}\right) - 386.95 \left(\frac{\ln(OVB)}{TVD}\right) - \left(\frac{40.05}{TVD}\right)$$

where $\rho_m$ is the mud weight in grams/cubic centimeter (g/cc), OVB is the overburden stress in MPa, and TVD is the true vertical depth in meters (m). In some embodiments, the method includes determining, from a rate of salt creep, that the mud weight of the drilling mud exceeds a casing shoe fracture length. In some embodiments, the method includes using an underreamer tool to enlarge the wellbore.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

As described below, embodiments of the disclosure may model salt creep behavior and empirical relationships to capture atypical physical phenomena, especially for salt accumulation encountered in exploratory drilling and well boring in new frontiers. As will be appreciated, only in statistically determinate problems (that is, problems for which the stresses can be exclusively determined from equilibrium equations) can the use of closed form constitutive equations provide analytical solutions for stresses, strains, and displacements. Consequently, embodiments of the disclosure further include predrill salt mobility analyses using equilibrium, compatibility, and constitutive equations under applicable initial and boundary conditions, and practice-based feedback approaches to achieve the objective of intersecting hydrocarbon reservoirs beneath a salt accumulation.

Figure 1:
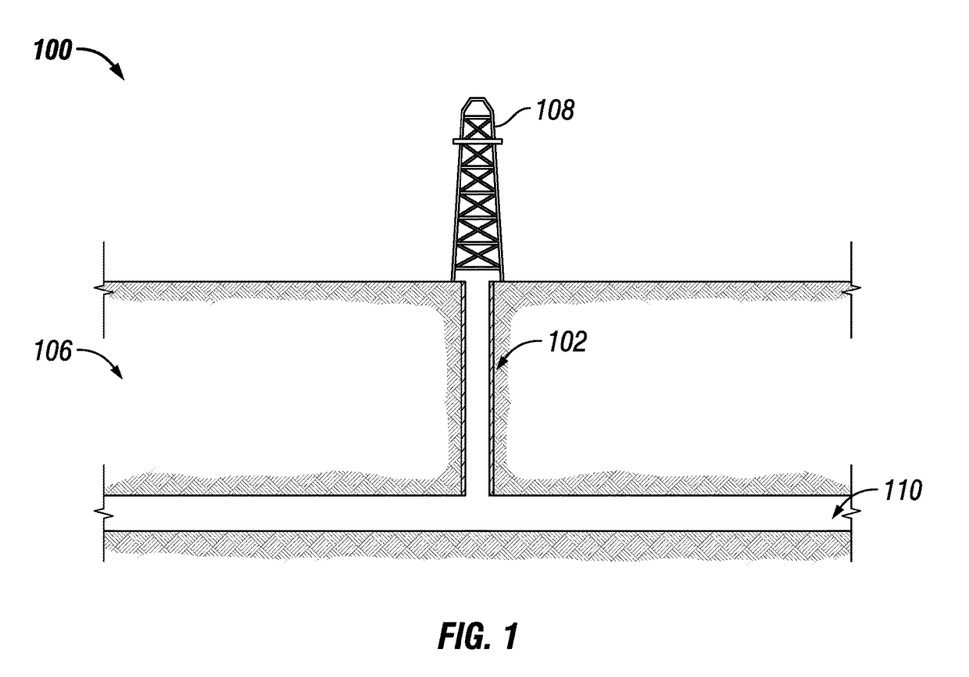
FIG. 1 is a schematic diagram of a well site illustrating a drilling operation for drilling a well in accordance an embodiment of the disclosure.

With the foregoing in mind, FIG. 1 depicts a well site 100 illustrating a drilling operation for drilling a well 102 in accordance with an embodiment of the disclosure. The well 102 may extend from the surface 104 into the earth 106 in order to locate or access a hydrocarbon-bearing formation. The well 102 may include any form of a hole formed in a geologic formation for the purpose of extracting hydrocarbons or other resources from the earth 106. For example, the well 102 may be an exploratory well used to locate extractable hydrocarbons or other resources from the earth 106.

The well 102 may be formed via the insertion of pipe (which may refer to or be described as a "drill string") run into the wellbore of the well 102 via drilling rig 108. As will be appreciated, the pipe may be coupled to a bottom hole assembly (BHA) and a drill bit (not shown) for drilling the well 102 according to operations known in the art. As the well is further defined, additional pipe may be inserted (that is, "run") in the wellbore to extend the length of the pipe during drilling and facilitate access to a reservoir of the hydrocarbon-bearing formation.

As will be appreciated, the earth 106 may take the form of complex geology or topography and may include various layers. For example, as shown in FIG. 1 the earth may include a salt layer 110. In some embodiments, the salt layer 110 may include a base salt layer and multiple subsalt layers. As also shown in FIG. 1, drilling operations forming the well 102 may encounter the salt layer 110. The salt layer 110 may affect drilling operations and formation of the well, as described herein. In some embodiments, hydrocarbons (for example, in a hydrocarbon reservoir) may be located beneath the salt layer 110.

As will be appreciated, various attempts to predict salt behavior via mathematical models include the use of laboratory experiments, field calibration of parameterized equations and annotated nomographs For example, Weijermars describes a two-dimensional framework upon which a constitutive model can be developed that includes the elastoplastic behavior of a salt body when in situ equilibrium is punctuated by a drill-bit such that the salt elastically deforms in a timespan in the range of 1 hour to 1000 hours. Along a tectonic timescale, that is, a timescale in the range of 1 to $10^8$ years, salt behaves viscoelastically. Salt creep, however is a viscoplastic phenomenon that occurs as slipping and gliding occurs between salt's microcrystalline planes.

Embodiments of the disclosure address salt behavior of the rapid viscoplastic shape change and time phase that may result in a high rate of wellbore closures and resulting well construction problems. This rapid viscoplastic phase of salt is characterized by a high strain rate under differential stress and other compositional attributes such as subsurface temperature, depth of burial (occurrence), mineralogical composition, water content, abnormally pressured encapsulations, and presence of impurities. As will be appreciated, steady state salt creep may be closely simulated and predicted by the Maxwell model. As temperature, depth of burial (occurrence), overlying or underlying formation type, and overburden all influence salt behavior effects, an equation that permits the examination of predominance of these factors may provide better determination and prediction of salt behavior. In addition, to enable real-time determinations of the severity of salt creep, a model with field-derived input and constitutive equations with empirically-determined variables may provide solutions that rapidly converge and track physical phenomenon.

Existing models, such as the linear Maxwell model and the approach described by Dusseault, outline a process that lists drilling risks, geophysical properties of salt types, summary enumeration of the governing geomechanical theories underlying the constitutive models for salt creep, and drilling strategies interspersed with best practice guidelines for avoiding costly adverse effects of wellbore loss or closure. Additionally, analytical equations modeling salt behavior are available in the literature and represent progressive improvement over theoretical representations; however, none of the existing approaches combine an analytical equation and parameters for field-derived measurements. Charlez describes the derivation of the equation for the determination of mud weight required to achieve salt load balance from Barker's equation. See Ph A. Charlez, *Rock Mechanics Vol.* 2, Petroleum Applications, Editions Technip, Paris (1997). As described in Weijermars and Liang, the equation may be rewritten to be able to use field-derived drilling log data, well-constrained laboratory-derived properties of salt and real-time closed loop adjustments. Weijermars; Liang et al., *Experimental Investigation of mechanical properties of bedded salt rock*, 44 Int. J. Rock Mech. Mining Sci., pp. 400-411 (2007). This lumped parameter approach provides a compact and robust representation of the variables required for pre-drill assessments, real-time measurements to analyze salt mobility, and a design of a drilling strategy to mitigate the adverse effects on the well construction process.

Table 1 lists the reference values for Young's modulus (E) in gigapascals for various salt types obtained from well constrained laboratory studies. See Weijermars; See da Costa et al., *Geomechanics Applied to the Well Design Through Salt Layers in Brazil: A History of Success*, American Rock Mechanics Association (ARMA-10-239) (2010).

TABLE 1

YOUNG'S MODULI FOR SALT TYPES

| Salt Type | Young's modulus - Low (GPa) | Young's modulus - Low (GPa) | Source/Reference |
|---|---|---|---|
| Halite | 3 | | Weijermars |
| | | 20.4 | Costa |
| Mogilno | 2.2-3.5 | | Weijermars |
| Carnallite | 4.02 | | Costa |
| Tachyhydrite | 4.92 | | Costa |
| Rock Salt | | 11 (under | Weijermars |

TABLE 1-continued

YOUNG'S MODULI FOR SALT TYPES

| Salt Type | Young's modulus - Low (GPa) | Young's modulus - Low (GPa) | Source/ Reference |
|---|---|---|---|
| | | confining pressure of 40 MPa and elevated temperature of 85° C.) | |
| Rock Salt | | 28-35 | Weijermars |
| Rock Salt | | 31 | Weijermars |

The effective halite salt viscosity ($\eta$) is shown on Table 2. As will be appreciated, the reference values for effective halite salt viscosity available in the literature are typically considered valid only with the consideration of the dependence on temperature, moisture content, grain size, and strain rate.

TABLE 2

EFFECTIVE HALITE SALT VISCOSITY

| Salt Type | Effective halite salt viscosity ($\eta$) (Pa S) | Source/Reference |
|---|---|---|
| Rock Salt | $10^{16}$-$10^{19}$ | Weijermars |

Charlez solves Barker's analytical solution for the wellbore closure rate to determine the minimum mud density required to reduce wellbore creep closure by about 3% of the original wellbore diameter. See Charlez. Barker's analytical solution is shown below in Equation 1:

$$R = R_0 \exp\left[-\frac{(\sqrt{3})^{(n+1)}}{4n-2} A e^{-\frac{B}{T}} (p_0 - p_w)^n \Delta t\right] \quad (1)$$

Charlez's solution for solving Barker's equation for $p_w$ is expressed in Equation 2:

$$p_w = p_0 - \left[\frac{-\ln\frac{R}{R_0}}{\frac{(\sqrt{3})^{(n+1)}}{4n-2} A e^{-\frac{B}{T}}(t_d - t(z))}\right]^{\frac{1}{n}} \quad (2)$$

where $p_w$ is the wellbore pressure or mud weight, $p_o$ is the in situ pressure or overburden, R is the wellbore radius after creep has occurred, $R_0$ is the original wellbore radius, A is the salt constant, B is the salt temperature exponent, T is the formation temperature, n is the salt stress exponent, and $\Delta t$ is determined according to Equation 3:

$$\Delta t = t_d - t(z) \quad (3)$$

where $t_d$ is the difference in time required to drill across a salt section (that is, total open hole) and t(z) is the time at which a section of depth z is reached.

As will be appreciated, the salt balance load mud weight (SBLMW) determination process may be modeled like a statically determinate problem for which the hold back pressure (that is, load) necessarily counterbalances the disequilibrium caused by the drill bit as it removes some of the salt maintaining stress-state equilibrium and creates a low pressure void to initiate creep. Zhang et al. applies Barker's equation for drilling a Gulf of Mexico well across a salt accumulation and provides calibration-derived coefficients for the variables in the equation to determine hole size radius change under a steady strain rate. See Zhang et al., 2008, *Casing Ultradeep, Ultralong Salt Sections in Deep Water: A Case Study for Failure Diagnosis and Risk Mitigation in Record-Depth Well*, Society of Petroleum Engineers 114273 (2008) (hereinafter Zhang).

The expression for steady strain rate is shown in Equation 4:

$$\dot{\varepsilon} = A(\sigma_H - p)^n e^{-B/[(T+459.67)/1.8]} \quad (4)$$

Based on Equation 4, the hole size change after salt creep may be expressed as in Equation 5:

$$r = r_0\left[1 - Ae^{-\left[\frac{B}{(T+459.67)}\right]}(\sigma_H - p)^n t\right] \quad (5)$$

where r is the wellbore radius after creep in inches, $r_0$ is the wellbore radius before creep in inches, T is the formation temperature in ° F., $\sigma_H$ is the maximum horizontal in-situ stress in psi, p is the wellbore pressure or hydrostatic pressure from mud weight in psi, t is the time in days, and A, B, and n are coefficients for various salt constraints, such that A=1.22±0.6×$10^{-8}$, B=8000±2000, and n=4.5±1.3.

For the specific study and research published by Zhang, the rate of salt creep was estimated using the following values for the coefficients for the salt constants: A=1×$10^{-8}$, B=6000, and n=4. For another study and research published by Costa, the values for the coefficient for the salt stress constant (n) for halite was in the range of about 3.36 to about 7.55 at a temperature of about 86° C. and subject to a differential stress range ($\sigma_{dev}$-$\sigma_0$) of about 4 MPa to about 20 MPa.

The gradient exponent of Equation 5 that includes the B salt constraint coefficient is shown in Equation 6:

$$-B/\left[\frac{T+459.67}{1.8}\right] \quad (6)$$

Figure 2:
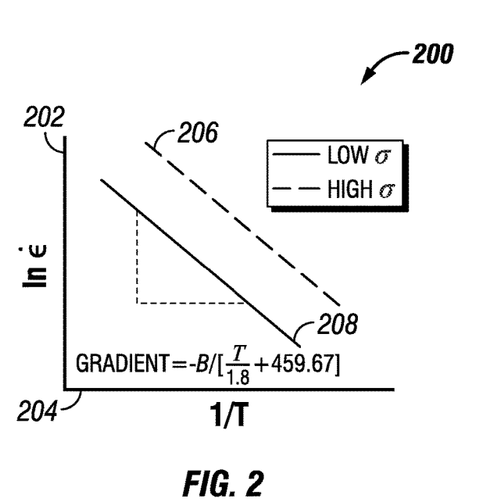
FIG. 2 is a plot of the natural log of a strain rate versus the reciprocal of temperature and showing high and low stress in accordance with an embodiment of the disclosure.
Figure 3:
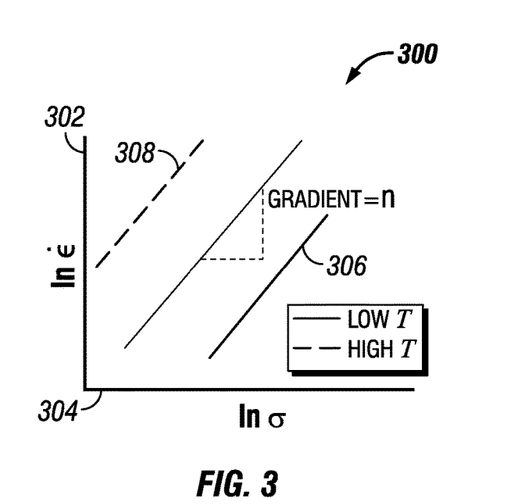
FIG. 3 is a plot of the natural log of the strain rate versus the natural log of stress and showing high and low temperatures (T) in accordance with an embodiment of the disclosure.

In the absence of experimentally derived coefficients for the constants in the gradient, the salt constraint coefficient B in Equation 6 may be obtained by plotting the natural log of the strain rate against the reciprocal of temperature T. For example, FIG. 2 depicts a plot 200 of the natural log of the strain rate (ln $\dot{\varepsilon}$) on the y-axis 202 versus the reciprocal of temperature (1/T) on the x-axis 204, with lines 206 and 208 representing high and low stress ($\sigma$) respectively. Similarly, the coefficient for the salt stress constant (n) may be determined by plotting strain rate E as a function of stress ($\sigma$). For example, FIG. 3 depicts a plot 300 of the natural log of the strain rate (ln $\dot{\varepsilon}$) on the y-axis 302 versus the natural log of the stress ($\sigma$) on the x-axis 304, with lines 306 and 308 representing high and low temperatures (T) respectively.

With the foregoing in mind, embodiments of the disclosure may include processes for implementing a salt mobility assessment and determining a salt balance load mud weight (SBLMW) in accordance with the following techniques.

As will be appreciated, the primary tool used in the imaging of subsurface data is a seismic survey. As salt is structurally complex, seismic waves travel through the salt strata at higher velocities than surrounding rock layers, thus resulting in poor images in surface seismic surveys. As known to those in skilled in the art, improvement in acquisition techniques and advanced inversion algorithms have resulted in improved image resolution and visualization. Such techniques include: 1) 3D acquisition with single sensor systems having increased seismic image resolution that offer greater than 40% bandwidth, 2) Wide Area Azimuth (WAZ) or Rich Azimuth (RAZ) survey methods that increase azimuthal coverage for enhanced visualization of subsalt formations, and 3) walk-around or shooting in circles borehole seismic acquisition methods. Various features obtained from analysis and inspection of a seismic image upon inspection may be used by embodiments of the disclosure. Such features include: 1) The post-salt sediment layer structural and topographic complexity of the rock-salt entry; 2) Discernable presence of inclusions (sediments, sutures, etc.) or intercalations, or the absence thereof; and 3) Base of salt or pre-salt geometric peculiarities and stratigraphic discontinuities with hydro-mechanical anomalies. The seismic cross-section analysis and inspection process may provide a basis for a determination of the degree of structural complexity and effects on salt body stability, including depth of occurrence, geometry of entry and exit interfaces, and implications to drilling progress.

The determination of a pore pressure-fracture gradient (PP-FG) and overburden (OVB) profile and its use as a prediction tool may be performed according to techniques known in the art. For example, U.S. Pat. No. 5,615,115, incorporated herein in its entirety for the purposes of United States patent practice, describes an example determination. As known to those of ordinary skill in the art, the local pressure profile and rock strength development increases with increasing depth or burial and is correspondingly described as a normal compaction trend (NCT). From the seismic profile and the bright and dark spot patterns (velocity reflectors), and knowledge of the depositional patterns and lithology (sand and shale sequences), an effective stress-velocity transform may be used to determine pore pressure. The overburden (OVB) determination may be derived from integration of the density log data from offset and analog wells if available. In some embodiments, the Bowers power law relationship may be utilized, as expressed in Equation 7:

$$V_p = V_0 + A\sigma^B \quad (7)$$

Where $V_p$ is the compressional velocity, $V_0$ is the mudline compressional velocity, and A is a coefficient and B is an exponent for which their magnitudes are calibrated by offset velocity versus effective stress data.

Additionally, Huffman describes a calculated vertical stress correlation equation that provides coefficients that establish a connection with below mudline (BML) depth. See Huffman et al., *Recent Advances in Pore Pressure Prediction in Complex Geologic Environments*, Society of Petroleum Engineers 142211-PP (2011). The vertical stress correlation equation is shown in Equation 8:

$$\text{Vertical Stress} = \text{Overburden} = 0.0019832 \times d^{1.0638} \quad (8)$$

Where vertical stress is in kilopounds-per-square-inch (kpsi) and d is the depth below mudline in meters (m).

As will be appreciated, pore (fluid) pressure may be determined from Terzhagi's relationship, as expressed by Equation 9:

$$\text{Vertical stress(Overburden)} = \text{Pore(fluid)pressure} + \text{Effective Stress} \quad (9)$$

Additionally, fracture pressure and gradient may be determined using a constant percentage of overburden if offset or analog leak off test (LOT) well data is available. Alternatively, fracture pressure and gradient may be determined using the Matthews and Kelly equation known in the art and expressed by Equation 10:

$$P_F = P_P + [K_\sigma \times (OVB - P_p)] \quad (10)$$

Where $P_F$ is the fracture pressure, $P_p$ is the fluid (pore pressure), and $K_\sigma$ is the effective stress ratio defined as $K_\sigma = \sigma_{mine}/\sigma_{maxe}$, where $\sigma_{mine}$ is the minimum effective stress and $\sigma_{maxe}$ is the maximum effective stress.

Using the relationship expressed in Equation 9, the maximum effective stress may be expressed according to Equation 11:

$$\sigma_{maxe} = OVB - P_p \quad (11)$$

Finally, as will be appreciated, salt creep may be amplified by the magnitude of deviatoric stress, as shown in Equation 12:

$$S_{ij} = \sigma_{ij} - h_{ij} \quad (12)$$

Where $S_{ij}$ is the deviatoric stress, $\sigma_{ij}$ is the present state of stress, and $h_{ij}$ is the hydrostatic stress ($\sigma_1 = \sigma_2 = \sigma_3$) in matrix presentation, as shown in Equation 13:

$$\begin{bmatrix} S_{11} & S_{12} & S_{13} \\ S_{21} & S_{22} & S_{23} \\ S_{31} & S_{32} & S_{33} \end{bmatrix} = \begin{bmatrix} \sigma_{11} & \sigma_{12} & \sigma_{13} \\ \sigma_{21} & \sigma_{22} & \sigma_{23} \\ \sigma_{31} & \sigma_{32} & \sigma_{33} \end{bmatrix} - \begin{bmatrix} h & 0 & 0 \\ 0 & h & 0 \\ 0 & 0 & h \end{bmatrix} = \begin{bmatrix} \sigma_{11} - h & \sigma_{12} & \sigma_{13} \\ \sigma_{21} & \sigma_{22} - h & \sigma_{23} \\ \sigma_{31} & \sigma_{32} & \sigma_{33} - h \end{bmatrix} \quad (13)$$

Where h is the hydrostatic stress, such that h may be defined as confining pressure and determined from the average stress $\sigma_{average}$, determined as shown in Equation 14:

$$\sigma_{average} = \frac{\sigma_{11} + \sigma_{22} + \sigma_{33}}{3} = \frac{\sigma_{ii}}{3} \quad (14)$$

The deviatoric stress may thus be determined according to Equation 15:

$$\sigma_{dev} = \sigma_{ij} - \sigma_{average} \quad (15)$$

The maximum horizontal stress and minimum horizontal stress ($\sigma_{ij}$) may be determined according to Equation 16:

$$\sigma_H = \sigma_h + k(\sigma_V - \sigma_h) \quad (16)$$

Where $\sigma_H$ is the maximum horizontal stress, $\sigma_h$ is the minimum horizontal stress, and k is the ratio of $\sigma_H$ to $\sigma_h$ and $\sigma_V$.

As will be appreciated, k may be assumed to have a nominal value of 0.5, such that $\sigma_H$ is the average between minimum stress and overburden.

Predicting salt mobility and determining the salt balance load mud weight (SBLMW) to reduce creep may be based on knowledge of the stress state of rock overlaying the salt interval. In a salt formation, the in situ stress may be assumed to be equal in all directions and equal to the magnitude of the overburden (OVB).

Salt is non-porous and impermeable; moreover, the propensity of salt to creep and the resulting closure rate of a wellbore drilled in a salt formation may increase with increasing temperature and differential pressure. Thus, when salt is encountered at greater depths, the correspondingly higher temperatures and higher differential pressures amplify the creep rate. In some embodiments, a geothermal gradient analysis may be performed using a linear propagation scheme beginning at an ambient surface temperature reference, a subsurface reference obtained from thermal infrared measurements, or direct measurements by electrical logging instruments.

The link between the mud weight required to achieve salt load balance and reduce creep provided by embodiments of the invention may use the Leyendecker and Murray isothermal curves, especially in bottom-hole (depth of wellbore) temperatures between 200° F. and 400° F. See Leyendecker, et al., 1975, *Properly prepared oil muds aid in massive salt drilling*, World Oil Magazine Vol. 93 (1975). As will be appreciated, another phenomenon associated with salt mobility during rapid creep phase characterized by inelastic deformation is dilatancy.

A determination for computing the minimum mud weight required to prevent creep during drilling or tripping governed the stability criterion described in Henglin was derived by Rios. See Henglin et al., *Deformation mechanisms and safe drilling fluids density in extremely thick salt formations*, Petroleum Science Journal, Springer-Link, Issue 4, Vol. 4, pp. 56-61 (2007); See Rios et al., *Dilatancy Criterion Applied for Borehole Stability During Drilling Salt Formations*, Society of Petroleum Engineers 153627 (2012). The determination is expressed in Equation 17:

$$\rho_m = 101.94 \left(\frac{OVB}{TVD}\right) - 386.95 \left(\frac{\ln(OVB)}{TVD}\right) - \left(\frac{40.05}{TVD}\right) \quad (17)$$

Where $\rho_m$ is the mud weight in grams/cubic centimeter (g/cc), OVB is the overburden stress in MPa, and TVD is the true vertical depth in meters (m).

Embodiments of the disclosure include the determination of the risk and mitigation of salt mobility and a wellbore construction strategy that includes a choice of post-salt sediment isolation depth at salt entry with suitable casing and drilling practices to manage wellbore closure and include real-time review of petrophysical and drilling parameter indicators. The wellbore construction workflow may include actions to be followed at a wellsite for determination of the post-salt casing point, the estimated duration of wellbore drilling/boring in the salt interval informed by the salt creep rate and thickness, and the thickness rubble zone at salt base.

Figure 4:
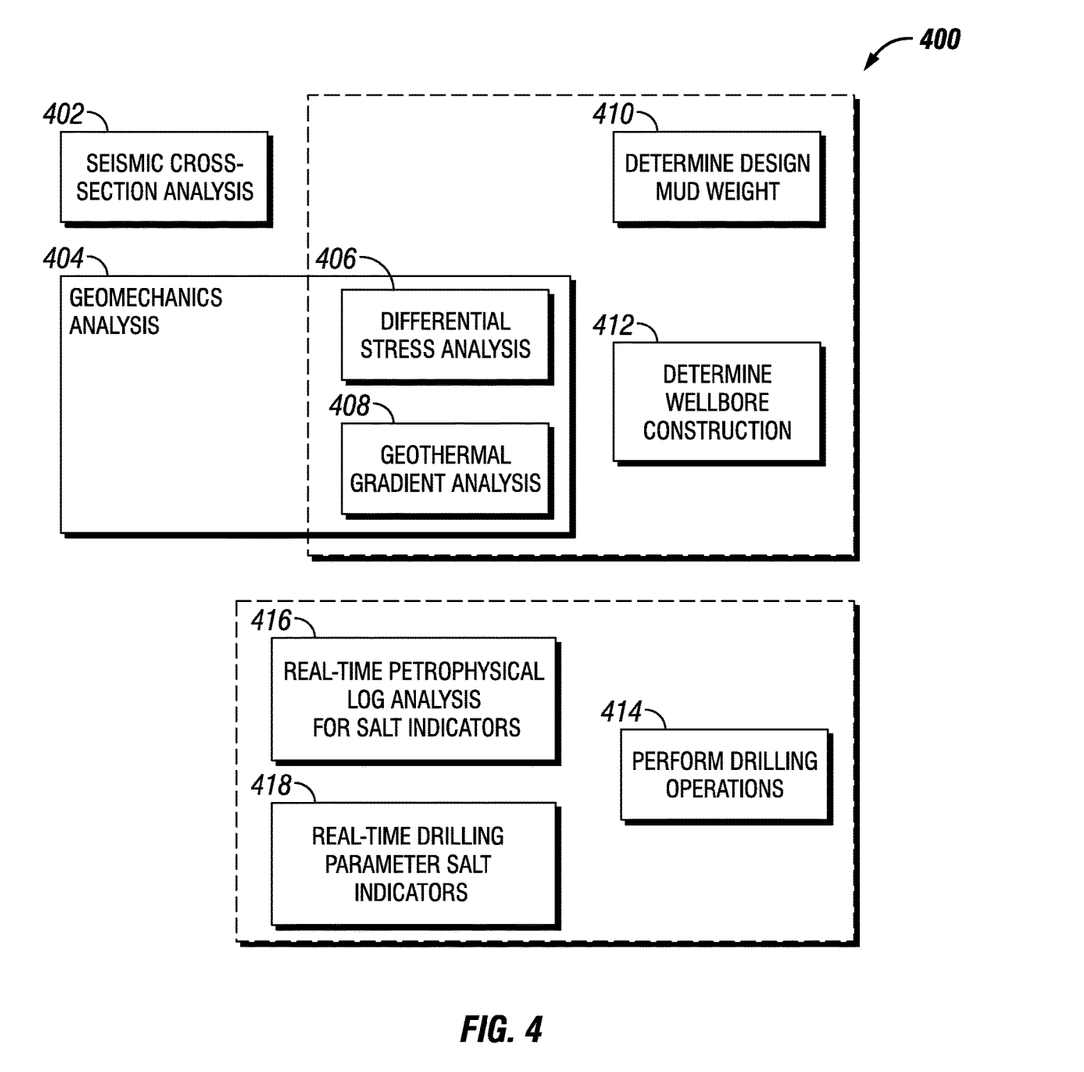
FIG. 4 is a flowchart of a process for a predrill drilling analysis for a wellbore that will intersect and traverse a subsurface salt accumulation in accordance with an embodiment of the disclosure.

FIG. 4 depicts a process 400 for a predrill drilling analysis for a wellbore (sometimes referred to as a "wellpath") that will intersect and traverse a subsurface salt accumulation, in accordance with an embodiment of the disclosure. Initially, a seismic cross section (or, in some embodiments, a chart displaying an interpretation of seismic data) may be analyzed (block 402). In some embodiments, the seismic cross section analysis may include determination of the following: 1) The post-salt sediment layer structural and topographic complexity of the rock-salt entry; 2) The presence of inclusions (sediments/sutures) or intercalations, or the absence thereof; and 3) Base of salt or pre-salt geometric peculiarities and stratigraphic discontinuities with hydro-mechanical anomalies.

Next, a geomechanics analysis is performed (block 404) to predict potential salt behavior under differential mechanical and geological loads. As will be appreciated, the seismic cross-section analysis (block 402) may be used in the geomechanics analysis. In some embodiments, the geomechanics analysis (block 404) may be used to design a pore pressure-fracture gradient (PP-FG) profile. In some embodiments, the geomechanics analysis may include a differential stress analysis (block 406) and a geothermal gradient analysis (block 408) employing mathematical and physical equations of state to estimate the PP-FG profile, approximate the propensity and severity of salt mobility, and estimate a salt balance load mud weight (block 410) (or, in some embodiments, wellbore pressure) to reduce and prevent wellbore closure. As will be appreciated, the differential stress analysis (block 406) may be performed to determine potential intervals with abnormal pressure gradients and define and integrate geothermal gradient moduli. The geothermal gradient analysis (block 408) may be performed to construct a reference geomechanics model for the wellbore.

As shown in FIG. 4, in some embodiments the process 400 may include the determination of wellbore construction (block 412) for constructing a wellbore through a salt formation. For example, wellbore construction for drilling a well may be determined based on the geomechanics analysis (block 404), such as an estimated PP-FG profile, salt mobility, and salt balance load mud weight (block 410). As will be appreciated, the results of the seismic cross-section analysis (block 402) and geomechanics analysis (block 404) may determine the robustness and quality of the wellbore construction determinations. For example, the availability of a seismic cross-section of a sufficient resolution may show post-salt sediment layer structures, indicators of tectonic mobility, and existence of non-salt interbedding or diapiric complexities. In another example, from the geomechanics analysis, the stress state of the salt may be inferred from the overburden, the depth of occurrence of the salt/top or salt/salt entry, temperature gradient, and a prediction of creep severity.

Next, drilling operations may be performed (block 414) based on, for example, the wellbore construction determination. As will be appreciated, the wellbore construction may include sequence of actions and instruction typically included in a drilling program. As used herein, the term "drilling program" refers to an engineering plan for constructing a wellbore. From the geomechanics analysis (block 404), nominal magnitudes for the overburden pressure (OVB) at the salt entry depth (that is, the top of a salt layer) may be estimated and used in Equation 18 described above to determine a drilling mud weight ($p_m$) to balance the salt load (or dissipate in situ stress that produces salt creep) at the true vertical depth (TVD) of the salt interval.

In the performance of drilling operations (block 414), two analyses may be concurrently performed: a real-time petrophysical log analysis (block 416) for salt indicators and a real-time drilling parameter determination as salt indicators (block 418). The real-time petro-physical log analysis (block 416) may be performed to provide real-time bottom hole (wellbore) indicators of the occurrence of salt given by measurements transmitted by a logging while drilling (LWD) tool or measurement by drilling (MWD) tool. In some embodiments, such indicators may include a gamma ray log values of ±15 American Petroleum Institute (API) units, resistivity log values in the range of 100 ohm-meter to 200 ohm-meter on the resistivity scale, and sonic compressional log values (DTc) in the range of 65 microsecond/foot (μs/ft) to 67 μs/ft on the sonic log scale. The real-time drilling parameter determination (block 418) may include a determination of drilling rate as an indicator of entry into the salt, with, for example, a change in rate of penetration (ROP) at constant applied weight on drilling assembly (that is, "weight on bit" (WOB)).

Figure 5:
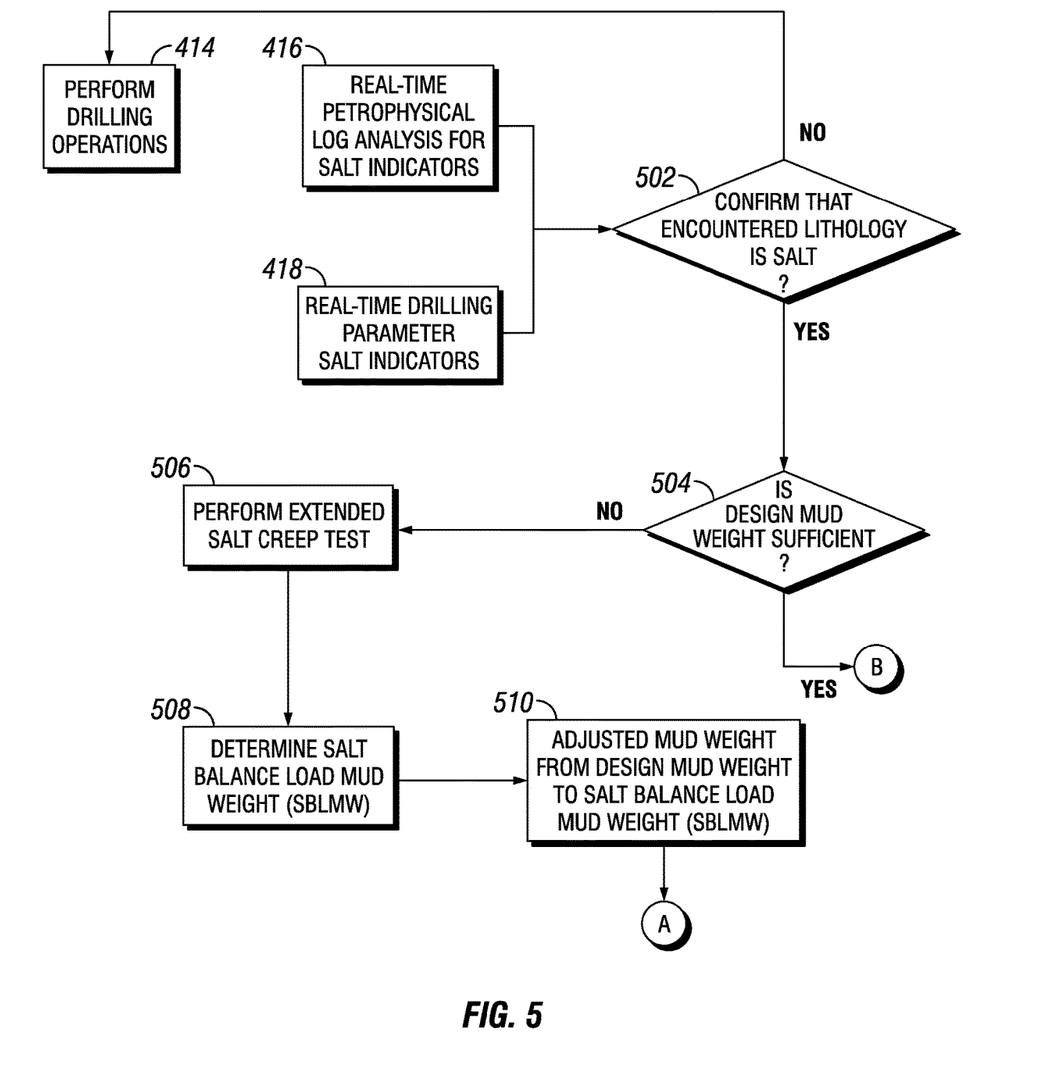
FIG. 5 is a flowchart of a process for drilling a wellbore in a salt formation or layer in accordance with an embodiment of the disclosure.

FIG. 5 is a flow chart of a process 500 for drilling a wellbore in a salt formation or layer in accordance with an embodiment of the disclosure. As shown in the process 500 in FIG. 5, the real-time petro-physical log analysis (block 416) and determination of a real-time drilling parameter (for example, drilling rate) (block 418) are used to confirm that the lithology encountered by the wellbore is a salt formation (decision block 502). If there no indications that a salt formation has been encountered, drilling operations may continue to be performed (block 414).

If the petrophysical measurements and drilling parameter indicators indicate the encounter of a salt formation, the sufficiency of the design mud weight is evaluated (decision block 504). For example, the evaluation may be performed by reversing out the drilling/boring assembly out of wellbore/borehole and noting the drag (additional hookload recorded on surface in excess of buoyant drillstring weight). In some embodiments, if the drilling assembly is equipped with an acoustic caliper sensor, the change in borehole dimension while pulling the drilling assembly partially out of the few feet of salt drilled can provide indications of salt mobility or the onset of creep.

If the design mud weight is insufficient (or a salt creep is identified from the real-time petrophysical log analysis (block 416) and determination of a real-time drilling parameter (for example, drilling rate), an extended salt creep test may be performed (block 506). In some embodiments, the drilling assembly currently located inside the last casing set before drilling/boring into the salt formation may be advanced into the wellbore/borehole. When inside the salt formation the drilling assembly may be rotated at a relatively low revolutions per minute (RPM) and the torque magnitude generated by the application of rotational force may be recorded. The drag generated as the drilling assembly is lowered (that is, advanced) into the wellbore may be recorded. If the tests produces torque readings and hookload (that is, pick up and slack off) higher than expected as an indication of salt creep, a salt balance load mud weight may be determined (block 508). The salt balance load mud weight may be determined by stepwise adjustments of the mud weight $p_m$ from the design mud weight (prevalent mud weight [MW]) in increments of 10 pounds-per-cubic foot (pcf) (block 510) and circulating the drilling mud in and out of the wellbore until the drilling mud at the SBLMW is in full circulation in the wellbore/borehole.

In some embodiments, after circulation of the drilling mud at the SBLMW to address salt creep, the extended salt creep test may be performed again (block 506) and the results recorded. The magnitude of torque and drag measured for the drilling assembly for axial travel and rotary motion may be compared with modeled thresholds for torque and drag as an indicator of salt creep and hole gauge within the wellbore through the salt formation.

Figure 6:
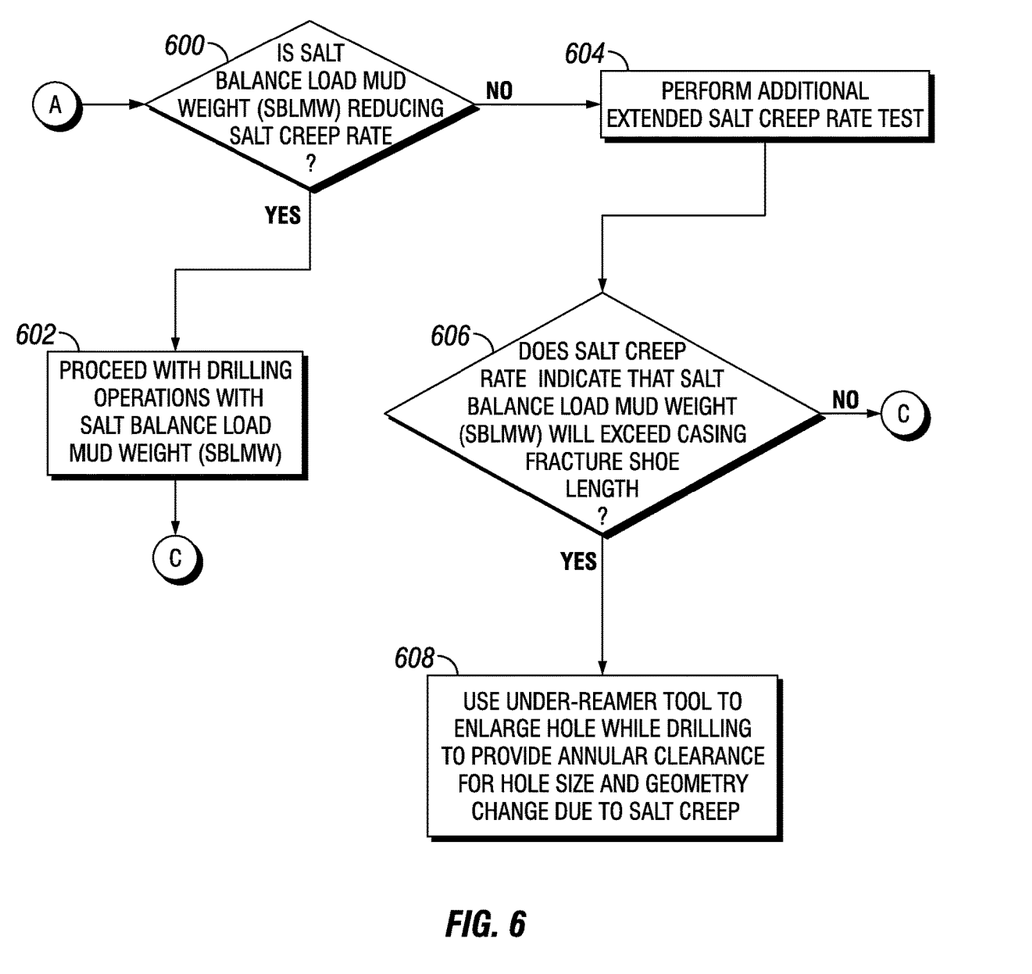
FIG. 6. is a flowchart depicting further elements of the process for drilling a wellbore in a salt formation or layer after adjustment of the drilling mud weight in accordance with an embodiment of the disclosure.

As shown by connection block A, the process 500 is further illustrated in FIG. 6. FIG. 6 depicts further actions of the process 500 after adjustment of the drilling mud weight in accordance with an embodiment of the disclosure. As will be appreciated, the determined SBLMW of the drilling mud circulated into the wellbore may be initially effective to reduce salt creep. However the effects of geomechanics anisotropy and salt-bed geothermal gradient distortions which culminate in producing dilatancy may result in further incremental adjustments to the SBLMW of the drilling mud.

Figure 7:
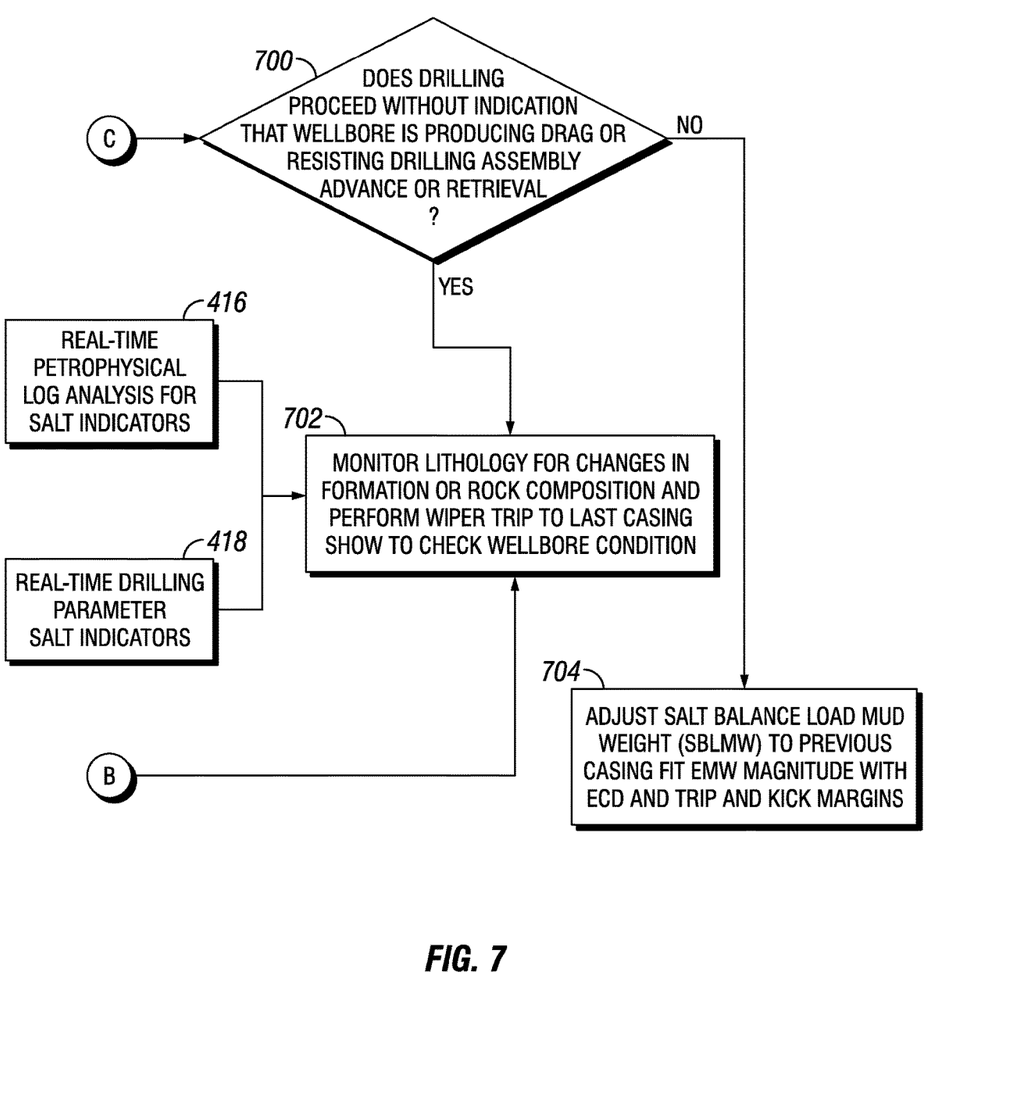
FIG. 7 is a flowchart depicting further elements of the process for drilling a wellbore in a salt formation or layer after proceeding with drilling operations with the drilling mud at the salt balance load mud weight (SBLMW) in accordance with an embodiment of the disclosure.

After adjustment of the drilling mud weight from the design mud weight to the SBLMW (block 510), the SBLMW may be evaluated to ensure the salt creep rate is being reduced (decision block 600). If the evaluation of the SBLMW indicates that salt creep rate is being reduced, drilling operations may continue with the drilling mud at the SBLMW (block 602), and as shown by connection block C, the process 500 may continue as illustrated in FIG. 7, and discussed below.

If the evaluation of the SBLMW does not indicate that salt creep rate is being reduced, an additional extended salt creep test may be performed (block 604). The additional extended salt creep test (block 604) may be similar to the extended salt creep test (block 506) described above but, in some embodiments, may include the following additional steps: from the last depth at which drilling in the salt accumulation has progressed, a new hole having a depth in the range of 90 feet to 100 feet may be drilled with the drilling mud at the SBLMW. The drilling parameters and hole gauge dimension from drilling progress logs and LWD measurements respectively may be evaluated for magnitude changes above a threshold amount. In such embodiments, the drilling parameters may include the geothermal gradient and the presence of non-salt sediment intercalations.

In some embodiments, the threshold amount for a geothermal gradient may be a measured downhole temperature change in the range of about 5 to about 10 over an interval of about 100 feet. If the additional salt creep rate test indicates a change in geothermal gradient equal or greater than this temperature change, the SBLMW of the drilling mud may be adjusted by about 10 pcf to reduce or stop salt creep. Similar, if other magnitude changes of the additional salt creep rate test are equal or exceed a threshold amount, the SBLMW of the drilling mud may be adjusted to reduce or stop salt creep.

In some embodiments, if the last casing shoe was placed just after penetration of the salt formation, the fracture strength of the casing shoe will likely be sufficient for the drilling mud at the SBLMW. However, in some embodiments, the drilling mud SBLMW may be evaluated to determine whether the weight may cause the casing shoe to fracture (block 606), that is, whether the SBLMW exceeds the casing shoe fracture strength. For example, if the last casing shoe is located in a shale/dolomite formation or a shale/claystone formation, a formation integrity test (FIT) or leak-off test (LOT) may be performed to determine the permissible hydrostatic load pressure or equivalent mud weight that the casing shoe may withstand without fracture. As shown in FIG. 6, If the SBLMW is likely to cause fracture of the casing shoe (for example, casing shoe fracture strength or leak-off strength is not sufficient for the SBLMW used to address the salt creep rate) a hole enlargement tool (referred to as an "underreamer" or "underreamer tool") may be used to enlarge the hole while drilling to provide annular clearance for the hole size and geometry change due to the salt creep (block 608).

In embodiments in which an underreamer is used, the following steps may be performed to enlarge of the hole when the SBLMW exceeds the fracture strength of the last casing shoe: 1) The drilling assembly may be retrieved from the wellbore to surface; 2) an underreaming bottom-hole assembly (UR-BHA) comprising a pilot bit and underreamer configured with under-reaming blades able to provide at least 2 inches of incremental hole gauge size may be configured and run into the wellbore/borehole; and 3) the UR-BHA is advanced into the wellbore with the under-reaming blades in retracted position until the UR-BHA has travelled into the wellbore past the last casing shoe depth.

As will be appreciated, a pocket may be cut by activating the reamer blades of the UR-BHA and slowly rotating the assembly to under-ream the original hole by starting with a section at a length in the range of about 10 feet to about 15 feet below the previous casing shoe. In some embodiments, drilling parameters may be evaluated to confirm that the UR-BHA is operating correctly and opening the hole. After confirmation, the remainder of the hole to be drilled through the salt formation may be enlarged while drilling. As noted above, the enlarged (that is under-reamed hole) may be increased in diametric-size by at least 2 inches from the original hole gauge size dimensions. The enlarged (that is, under-reamed hole) reduces friction loss and inductive resistance to flow in the annulus formed by the drilling assembly and wellbore. Consequently, the SBLMW of the drilling mud may be increased up to the magnitude of the previous casing shoe fracture strength without inducing fracture when the drilling mud with the increased SBLMW is circulated into the wellbore to arrest the salt creep. As shown by connection block C, if the drilling mud at the SBLMW is not likely to cause the casing shoe to fracture (block 606), the process 500 may continue as illustrated in FIG. 7 and discussed below.

As shown by connection block B in FIGS. 5 and 7, the process 500 is further illustrated in FIG. 7. FIG. 7 depicts further elements of the process 500 after proceeding with drilling operations with the drilling mud at the SBLMW (block 602). As shown in FIG. 7, drilling operations may proceed so long as there are no indications that the wellbore is producing drag, resisting advance of the drilling assembly, or resisting retrieval of the drilling assembly (decision block 700). In some embodiments, such indications may be the torque and drag magnitude generated by the drilling assembly in the current wellbore while drilling with the drilling mud at the SBLMW.

If there are no indications that the wellbore is producing drag, resisting advance of the drilling assembly, or resisting retrieval of the drilling assembly, the lithology may be monitored for changes in formation or rock composition, and a wiper trip may be performed to the last casing shoe to determine the condition of the wellbore (block 702). As will be appreciated, a wiper trip may include the recovery and replacement of the drilling sting in the wellbore. In some embodiments, the lithology may be monitored via the real-time petrophysical log analysis for salt indicators (block 416) and real-time drilling parameter salt indicators (block 418), as also shown in FIG. 4 and discussed above.

If observed drilling torque and drag magnitudes continues to increase to levels that that the wellbore is producing drag, resisting advance of the drilling assembly, or resisting retrieval of the drilling assembly (that is, indications of protracted salt creeping), the SBLMW of the drilling mud may be adjusted (block 704) to the magnitude within a range at a maximum equivalent to the previous FIT equivalent mud weight (EMW) minus 5 pcf to accommodate equivalent circulating density (ECD) effects and trip and kick margins.

In some embodiments, elements of the process 500 may be implemented on a salt mobility assessment processing system. In such embodiments, a salt mobility processing system located at the surface may receive inputs from, for example, drilling operations and determine various elements of the process 400, process 500, or both. For example, in some embodiments a salt mobility assessment processing system may perform the geomechanics analysis 404, the differential stress analysis 406, and the geothermal gradient analysis 408, among other elements of the process 400.

An example salt mobility assessment processing system may be or include a computer or computing devices. In some embodiments, for example, a salt mobility assessment processing system may include a processor, a memory, and a display. As will be appreciated, in some embodiments a salt mobility assessment processing system may include other components such as a network interface, input device, etc.

A processor of an example salt mobility assessment processing system (as used the disclosure, the term "processor" encompasses microprocessors) may include one or more processors having the capability to receive and process data from a well, such as parameters obtained during drilling a well, logging-while-drilling (LWD), measurement-while-drilling (MWD), or a combination thereof. In some embodiments, the processor may include an application-specific integrated circuit (AISC). In some embodiments, the processor may include a reduced instruction set (RISC) processor. Additionally, the processor may include a single-core processors and multicore processors and may include graphics processors. Multiple processors may be employed to provide for parallel or sequential execution of one or more of the techniques described in the disclosure. The processor may receive instructions and data from a memory (for example, memory).

The memory of an example salt mobility assessment processing system (which may include one or more tangible non-transitory computer readable storage mediums) may include volatile memory, such as random access memory (RAM), and non-volatile memory, such as ROM, flash memory, a hard drive, any other suitable optical, magnetic, or solid-state storage medium, or a combination thereof. The memory may be accessible by the processor. The memory may store executable computer code. The executable computer code may include computer program instructions for implementing one or more techniques described in the disclosure, such as elements of the process 400, process 500, or a combination thereof.

In some embodiments, an example salt mobility assessment processing system may include a display that provides outputs on the display for viewing by an operator. For example, in some embodiments a display may provide outputs from the geomechanics analysis 404, the differential stress analysis 406, the geothermal gradient analysis 408, or other elements of the process 400, or elements of the process 500. Such a display may include a cathode ray tube (CRT) display, liquid crystal display (LCD), an organic light emitting diode (OLED) display, or other suitable display. In some embodiments, the display may display a user interface (for example, a graphical user interface). In accordance with some embodiments, the display may be a touch screen and may include or be provided with touch sensitive elements through which a user may interact with the user interface.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method for drilling a well having a wellbore extending into the earth, comprising:
   obtaining well log data from a logging-while-drilling (LWD) tool, wherein the well log data comprises resistivity data, gamma ray data, and sonic compression data;
   obtaining a drilling rate associated with drilling the well;
   determining, from the well log data and the drilling rate, the presence of a salt formation encountered by the wellbore;
   determining the presence of salt creep from a torque generated by a drilling assembly and a hook load;
   adjusting a mud weight of a drilling fluid,
   wherein determining the initial mud weight of the drilling fluid comprises determining the mud weight according to the following:

$$\rho_m = 101.94 \left(\frac{OVB}{TVD}\right) - 386.95 \left(\frac{\ln(OVB)}{TVD}\right) - \left(\frac{40.05}{TVD}\right)$$

where $\rho_m$ is the mud weight in grams/cubic centimeter (g/cc), OVB is the overburden stress in MPa, and TVD is the true vertical depth in meters (m).

2. The method of claim 1, wherein determining, from the well log data and the drilling rate, the presence of a salt formation encountered by the wellbore comprises at least one of the following:
   determining that a resistivity from the resistivity data is in the range of 100 to 200 ohm-meter;
   determining that a gamma ray measurement of the gamma ray data is in the range of ±15 gamma-ray, American Petroleum Industry (GAPI) units; and
   determining that a sonic compression of the sonic compression data is in the range of 65-67 microseconds/foot (μs/ft).

3. The method of claim 1, wherein determining, from the well log data and the drilling rate, the presence of a salt formation encountered by the wellbore comprises determining a change in drilling rate at a constant applied weight on the drilling assembly.

4. The method of claim 1, comprising determining the presence of salt creep by:
   reversing the drilling assembly out of the wellbore;
   obtaining a drag from the reversing.

5. The method of claim 1, comprising determining the presence of salt creep by determining a change in dimension of a borehole of the wellbore using an acoustic caliper sensor.

6. The method of claim 1, wherein determining the presence of salt creep from a torque generated by the drilling assembly and a hook load comprises:
   rotating the drilling assembly;
   obtaining the torque generating by the rotation of the drilling assembly.

7. The method of claim 1, wherein determining the presence of salt creep from a torque generated by the drilling assembly and a hook load comprises:
   inserting the drilling assembly into the wellbore;
   determining a drag generated by inserting the drill string into the wellbore.

8. The method of claim 1, wherein adjusting the mud weight of the drilling fluid comprises:
   iteratively reducing the mud weight of the drilling fluid by 10 pounds-per-cubic foot (pcf) until the mud weight of the drilling fluid results in full circulation of the drilling fluid.

9. The method of claim 1, comprising determining an initial mud weight of the drilling fluid.

10. A method for drilling a well having a wellbore extending into the earth, comprising:
    determining an initial mud weight of a drilling fluid;
    determining, from well log data and a drilling rate, the presence of a salt formation encountered by the wellbore, wherein the well log data comprises resistivity data, gamma ray data, and sonic compression data;
    determining the presence of salt creep from a torque generated by a drilling assembly and a hook load; and
    iteratively adjusting a mud weight of the drilling fluid until the drilling fluid has full circulation,
    wherein determining the initial mud weight of the drilling fluid comprises determining the mud weight according to the following:

$$\rho_m = 101.94 \left(\frac{OVB}{TVD}\right) - 386.95 \left(\frac{\ln(OVB)}{TVD}\right) - \left(\frac{40.05}{TVD}\right)$$

where $\rho_m$ is the mud weight in grams/cubic centimeter (g/cc), OVB is the overburden stress in MPa, and TVD is the true vertical depth in meters (m).

11. The method of claim 10, wherein determining, from the well log data and the drilling rate, the presence of a salt formation encountered by the wellbore comprises at least one of the following:
    determining that a resistivity from the resistivity data is in the range of 100 to 200 ohm-meter;
    determining that a gamma ray measurement of the gamma ray data is in the range of ±15 gamma-ray, American Petroleum Industry (GAPI) units; and
    determining that a sonic compression of the sonic compression data is in the range of 65-67 microseconds/foot (μs/ft).

12. The method of claim 10, wherein determining, from the well log data and the drilling rate, the presence of a salt formation encountered by the wellbore comprises determining a change in drilling rate at a constant applied weight on the drilling assembly.

13. The method of claim 10, comprising determining the presence of salt creep by:
    reversing the drilling assembly out of the wellbore;
    obtaining a drag from the reversing.

14. The method of claim 10, comprising determining the presence of salt creep by determining a change in dimension of a borehole of the wellbore using an acoustic caliper sensor.

15. The method of claim 10, wherein iteratively adjusting a mud weight of the drilling fluid until the drilling fluid has full circulation comprises reducing the mud weight by 10 pounds-per-cubic foot (pcf) at each iteration.

16. The method of claim 10, comprising determining, from a rate of salt creep, that the mud weight of the drilling fluid exceeds a casing shoe fracture length.

17. The method of claim 16, comprising using an under-reamer tool to enlarge the wellbore.

* * * * *